(12) United States Patent
Cyr

(10) Patent No.: US 7,426,021 B2
(45) Date of Patent: Sep. 16, 2008

(54) INTERFEROMETRIC OPTICAL ANALYZER AND METHOD FOR MEASURING THE LINEAR RESPONSE OF AN OPTICAL COMPONENT

(75) Inventor: Normand Cyr, Sainte-Foy (CA)

(73) Assignee: Expo Electro- Optical Engineering Inc., Quebec (CA)

( * ) Notice: Subject to any disclaimer, the term of this patent is extended or adjusted under 35 U.S.C. 154(b) by 198 days.

(21) Appl. No.: 11/287,972

(22) Filed: Nov. 28, 2005

(65) Prior Publication Data

US 2006/0114471 A1   Jun. 1, 2006

Related U.S. Application Data

(60) Provisional application No. 60/631,175, filed on Nov. 29, 2004.

(51) Int. Cl.
*G01N 21/00* (2006.01)
*G01B 9/02* (2006.01)

(52) U.S. Cl. .................. 356/73.1; 356/477; 356/491

(58) Field of Classification Search ............ 356/73.1, 356/477, 479, 491, 492
See application file for complete search history.

(56) References Cited

U.S. PATENT DOCUMENTS

| | | | | |
|---|---|---|---|---|
| 4,653,917 A | * | 3/1987 | Moeller et al. | ............... 356/466 |
| 6,376,830 B1 | | 4/2002 | Froggatt et al. | |
| 6,542,247 B2 | * | 4/2003 | Bockman | ................... 356/493 |
| 6,606,158 B2 | * | 8/2003 | Rosenfeldt et al. | ......... 356/73.1 |
| 6,697,150 B1 | * | 2/2004 | Galtarossa et al. | ......... 356/73.1 |
| 6,788,419 B2 | | 9/2004 | Cierullies et al. | |
| 6,813,028 B2 | | 11/2004 | Vanwiggeren | |
| 6,856,398 B2 | * | 2/2005 | Ruchet | ....................... 356/453 |
| 7,088,878 B2 | * | 8/2006 | Waagaard et al. | ............. 385/11 |
| 2003/0002041 A1 | * | 1/2003 | Peupelmann et al. | ........ 356/364 |
| 2003/0095264 A1 | * | 5/2003 | Ruchet | ....................... 356/491 |
| 2003/0151736 A1 | * | 8/2003 | Achtenhagen et al. | ..... 356/73.1 |
| 2003/0223073 A1 | * | 12/2003 | VanWiggeren et al. | ...... 356/477 |
| 2004/0036889 A1 | * | 2/2004 | Witzel et al. | ................ 356/491 |

OTHER PUBLICATIONS

Optical Vector Analysis Integrates Component Testing, Brian J. Soller Lightwave, Mar. 2004.

* cited by examiner

*Primary Examiner*—Patrick Connolly
*Assistant Examiner*—Scott M Richey
(74) *Attorney, Agent, or Firm*—Thomas Adams

(57) ABSTRACT

An interferometric optical analyzer apparatus comprises a light source, an interferometer and a detection system for determining the linear response, and subsequently any optical parameter, of one or more optical elements using substantially unpolarized light. In one embodiment, the light source supplies substantially unpolarized coherent light over a predetermined range of optical frequencies. The optical element is coupled in one arm of the interferometer and the other arm of the interferometer is used as a reference. The unpolarized light is first passed through the interferometer then through a three-way polarization splitter unit to split the light into at least three light beams according to preselected polarization axes corresponding to three linearly independent states of polarization. The three light beams are coupled to individual detectors and a controller computes Jones matrix elements from the resulting electrical signals. The total polarization independent power may also be determined by an additional detector.

33 Claims, 2 Drawing Sheets

INTERFEROMETRIC OPTICAL ANALYZER AND METHOD FOR MEASURING THE LINEAR RESPONSE OF AN OPTICAL COMPONENT

CROSS REFERENCE TO RELATED DOCUMENT

This application claims priority from U.S. Provisional patent application Ser. No. 60/631,175 filed Nov. 29, 2004, the contents of which are incorporated herein by reference.

The present application is related to Disclosure Document No. 522,396, entitled "Method and Apparatus for Measuring All Linear Parameters of an Optical Component", filed in the United States Patent and Trademark Office on Nov. 29, 2002, The entire contents of this Disclosure Document are incorporated herein by reference.

BACKGROUND OF THE INVENTION

1. Technical Field

The invention relates to an interferometric method and apparatus for measuring parameters of a device-under-test (DUT), particularly an optical element, for example an optical fiber, a sensor, a filter, a grating, a coupler, a power splitter, an interferometer, a modulator, a switch, integrated optics, and so on.

2. Background Art

The deployment of new optical technologies in optical networks is producing a demand for improved optical test and measurement techniques. As discussed in an article by Brian Soller entitled "Optical Vector Analysis Integrates Component Testing", Lightwave Magazine, March 2004, for example, DWDM components increasingly must be capable of operating over narrow channel spacing with low loss and dispersion. A growing number of parameters of these components must be characterized carefully and accurately. Such components may require very precise optical alignment. Consequently, physical properties may vary with time, with a concomitant variation in optical properties. Moreover, they may have multiple input and output ports, and maybe tunable. To measure an increased range of parameters of such components efficiently and cost-effectively, whether during product development or production, imposes stringent demands upon the instrumentation.

In general, the parameters to be measured include insertion loss (IL), return loss (RL), group delay (GD), chromatic dispersion (CD), polarization-dependent loss (PDL), polarization-mode dispersion (PMD) and crosstalk/isolation. In order to allow all of them to be derived, the instrument must not only measure amplitude and phase as a function of frequency, but also as a function of polarization.

Traditionally, the above-described measurements were performed on separate test stations. Such an approach is time consuming and expensive as the component must be connected and reconnected multiple times as well as moved between test stations. It is also highly likely that redundant measurements would be taken.

To address the issues associated with using multiple test stations, various systems have been developed which integrate the multiple test stations on a single platform. Typically, such a system will include a tunable-laser source, a wavemeter, a polarization controller, a modulator, and optical receivers. Although such systems may overcome the problems associated with connecting and reconnecting the DUT and moving the DUT between test stations, multiple measurements must still be made, and the problem of time consumption remains.

The complete linear response of a DUT can be determined using a measurement method known as optical vector analysis (OVA). This method performs coherent interferometry (also referred to as swept-homodyne interferometry) for various states of polarization (SOP) and fully characterizes the component by measuring the attenuation ($\alpha(\upsilon)$) and phase shift ($\phi(\upsilon)$), as functions of optical frequency ($\upsilon$) for each of various input SOPs and along different polarization axes at the output.

The transformation from input electrical field, $\vec{E}_0$, to output electrical field, $\vec{E}(\upsilon)$, may be expressed as:

$$\vec{E}(\upsilon) = J(\upsilon)\vec{E}_0 \qquad (1)$$

where $J(\upsilon)$ is the Jones matrix. The four elements of the Jones matrix in a particular reference frame completely characterize the linear response of the DUT. Known OVA apparatus and methods determine the elements of the Jones matrix and, because they employ continuous scans, can provide both frequency domain and time domain characterization of the DUT. Hence, they can compute parameters in either domain.

It is known to perform OVA using a polarized source at the input of the interferometer and an analyzer/polarizer after the output of the interferometer, before the photodetector. Four measurements are performed, i.e., two orthogonal states of polarization are launched into the input of the interferometer, or input of the DUT, and, for each input state of polarization, the powers along two orthogonal polarization axes are measured at the output of the interferometer as a function of optical frequency The resulting four distinct curves are used to calculate the Jones matrix as a function of frequency. Examples of such instruments are described in U.S. Pat. No. 6,606,158 (Rosenfeldt et al.), U.S. Pat. No. 6,376,830 (Froggatt et al.), U.S. Pat. No. 6,788,419 (Cierullies et al.) and U.S. Pat. No. 6,813,028 (Vanwiggeren).

A limitation of these known instruments is that the two signals associated with the two input orthogonal states of polarization launched simultaneously into the DUT are detected, in essence, as modulations of two distinct carriers of different frequencies and so are distinguished separately in the frequency domain. Consequently, the bandwidth of the receiver front end, typically comprising the photodetector, amplifier and analog-to-digital converter (A/D), must be at least twice the bandwidth of each signal.

Such an increase in bandwidth of a photodetector results in an increase in the spectral density of the photodetector noise. Reducing the required bandwidth so as to maximise the signal-to-noise ratio (SNR) of the instrument, however, will reduce the maximum value of chromatic dispersion that can be measured and limit the maximum optical path length of the DUT. On the other hand, reducing the required bandwidth by decreasing the scan speed is also undesirable because it will lead to longer measurement times, thus exacerbating stability problems, and impairing measurement of chromatic dispersion. Moreover, commercially available tunable lasers tend not to operate smoothly enough at lower scan speeds, even if means are used that mitigate the effect of scan speed instability by applying a correction to the sampled signals.

SUMMARY OF THE INVENTION

The present invention seeks to eliminate, or at least mitigate, the disadvantages of the known instruments, or at least provide an alternative.

According to a first aspect of the present invention, there is provided an interferometric optical analyzer apparatus for determining the linear response of an optical element (DUT), comprising:

light source means for supplying substantially unpolarized coherent light whose optical frequency is swept continuously and monotonically as a function of time over a predetermined range;

interferometer means having input means coupled to an output of the light source means, first and second arms, the first arm for receiving said optical element in series therein and the second arm being a reference path, and output means; and detection means for determining polarization-dependent power (P1, P2, P3) of light at the interferometer output for each of three linearly-independent states of polarization and a fourth power comprising either one of a power (P4) corresponding to a fourth linearly independent state of polarization and a total polarization-independent power (P) of said light at the interferometer output, the optical analyzer apparatus further comprising controller means for controlling the sweep of the light source means and computing Jones matrix elements ($J_{xx}$, $J_{xy}$, $J_{yx}$, $J_{yy}$) from the at least four power measurements (P1, P2, P3, P/P4).

Preferably, the three unit Stokes vectors representing said at least three different states of polarization form a substantially right-angled trihedron.

The apparatus may further comprise delay means in either or both arms of the interferometer. The delay may be adjustable.

Preferably, the controller causes the optical frequency of the light source to vary substantially linearly.

The light source means may comprise a tunable laser and a depolarizer.

According to a second aspect of the invention, there is provided interferometric optical analyzer apparatus for determining the linear response of an optical element (DUT), comprising:

light source means for supplying unpolarized incoherent light;

interferometer means having input means coupled to an output of the light source means, first and second arm, the first arm for receiving said optical element in series therein and the second arm being a reference path, and output means;

optical delay scanning means for analyzing the broadband light according to wavelength;

detection means for determining polarization-dependent power (P1, P2, P3), for each of three linearly-independent states of polarization, of light that has passed through the interferometer and been analyzed by the optical delay scanning means and determining a fourth power comprising either one of a power (P4) corresponding to a fourth linearly independent state of polarization and a total polarization-independent power (P) of said light at the interferometer output; and controller means for controlling the scanning of the optical delay scanning means and computing Jones matrix elements ($J_{xx}$, $J_{xy}$, $J_{yx}$, $J_{yy}$) from the at least four power measurements (P1, P2, P3, P/P4).

The optical delay scanning means may be disposed before or after the interferometer and may, itself, comprise a Michelson interferometer.

Other aspects of the invention comprise methods corresponding to the first and second aspects for determining Jones matrices of DUTs.

Thus, according to a third aspect of the invention there is provided a method for determining the linear response of an optical element (DUT), comprising the steps of:

connecting the DUT into a first arm of an interferometer means, a second arm of the interferometer means being a reference path, the first and second arms being connected between input means and output means of the interferometer means, an optical length difference between the said first and second arms defining a relative delay between light propagating along the two paths so as to produce interference at the output means;

supplying substantially unpolarized coherent light whose optical frequency ($\upsilon$) is swept continuously and monotonically as a function of time over a predetermined range into the input means of the interferometer means, using detection means comprising analyzing polarizers, detecting three polarization-dependent power values (P1, P2, P3) of three linearly-independent states of polarization, respectively, of light at said output means as a function of optical frequency ($\upsilon$) and a fourth power value (P/P4) comprising either one of a total polarization-independent power (P) or a power value corresponding to a fourth linearly-independent state of polarization (P4) of said light at the interferometer output, and computing the Jones matrix elements ($J_{xx}$, $J_{xy}$, $J_{yx}$, $J_{yy}$) from the four measured power values.

According to a fourth aspect of the invention, there is provided a method for determining the linear response of an optical element (DUT), comprising the steps of:

connecting the DUT into a first arm of an interferometer means, a second arm of the interferometer means being a reference path, the first and second arms being connected between input means and output means of the interferometer means, an optical length difference between the said first and second arms defining a relative delay between light propagating along the two paths so as to produce interference at the output means;

supplying substantially unpolarized incoherent light which has been analyzed according to wavelength by passing through an optical delay scanning means, into the input means of the interferometer means, using detection means comprising analyzing polarizers, detecting three polarization-dependent power values (P1, P2, P3) of three linearly-independent states of polarization, respectively, of light at said output means as a function of optical frequency ($\upsilon$) and a fourth power value (P/P4) comprising either one of a power value corresponding to a total polarization-independent power (P) or a fourth linearly-independent state of polarization (P4) of said light at the interferometer output, and computing the Jones matrix elements ($J_{xx}$, $J_{xy}$, $J_{yx}$, $J_{yy}$) from the four measured power values (P1, P2, P3, P/P4).

The foregoing and other objects, features, aspects and advantages of the present invention will become more apparent from the following detailed description, in conjunction with the accompanying drawings, of preferred embodiments of the invention.

DESCRIPTION OF THE PREFERRED EMBODIMENTS

Figure 1:
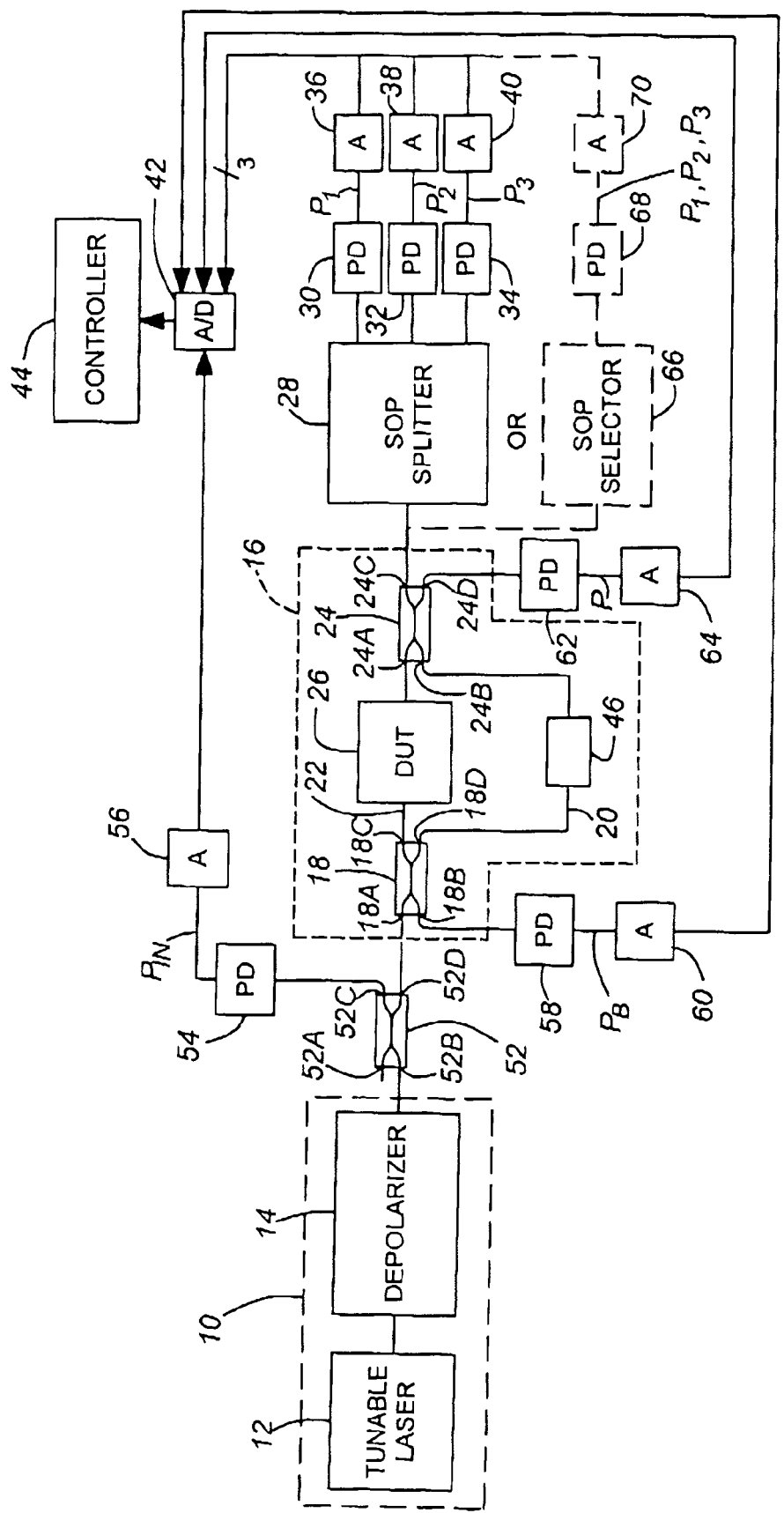
FIG. 1 is a block schematic diagram of an interferometric optical analyser that is a first embodiment of the invention.

FIG. 1 illustrates an interferometric optical analyzer apparatus for measuring the linear response of an optical element or device-under-test (DUT), which may comprise a waveguide, such as a fiber, or a discrete optical device such as a filter, grating, and so on as mentioned above. Once determined, the linear response can be used in determining all of the pertinent parameters of the device-under-test, for example its polarization-dependent loss (PDL), relative group delay, chromatic dispersion,, polarization mode dispersion (PMD), second order PMD, polarization-dependent chromatic dispersion, and so on. The apparatus comprises a coherent light source 10, specifically a tunable laser 12 and a depolarizer 14, an interferometer 16 comprising a first coupler 18, two arms 20 and 22, and a second coupler 24, the two arms 20 and 22 being connected between, respectively, the two output ports of the first coupler 18 and the two input ports of the second coupler 24.

A component, i.e., device-under-test (DUT) 26, whose parameters are to be measured, is connected into arm 22 of the interferometer 16. The output of the interferometer 16, specifically a first output port 24C of the second coupler 24, is coupled to an input of a three-way state-of-polarization (SOP) splitter unit 28, whose three output signals, corresponding to three different SOPs, are sent to three detectors 30, 32 and 34, respectively. Each of these outputs represents the projection of the input light state of polarization onto the corresponding analyzer axis.

The respective outputs P1, P2 and P3 of the detectors 30, 32 and 34 are coupled via amplifiers 36, 38 and 40 to an A/D converter unit 42 which converts the amplifier output signals to digital signals and supplies them to a controller 44.

Arm 20 of the interferometer 16, which constitutes a reference arm, comprises a variable delay 46 for varying the relative delay between the light propagating in the two arms, in effect adjusting the reference optical path length relative to the optical path length of the DUT 26 so that the resulting carrier frequency is substantially centered in the bandwidth of the detection system. Thus, the first and second output ports 18C and 18D of first coupler 18 are connected to the DUT 26 and the variable delay 46, respectively. The variable delay 46 couples the delayed light to the second input port 24B of coupler 24. Preferably, all components in the reference arm 20 have low PDL.

The maximum relative delay that can be measured is determined by the system bandwidth. Specifically, the carrier frequency (i.e. the product of the tunable laser scan speed and relative delay) must be smaller than the system bandwidth or it will be filtered out and one would have no signal whatsoever. Consequently, if the relative delay, i.e. the difference of delay between the two arms, becomes larger than the maximum delay that can be measured, the carrier frequency will be out of the operable range of the detection system. This problem may be overcome by adding additional delay to the appropriate arm of the interferometer 16, for example by means of external "fiberoptic jumpers", so that the relative delay and hence the carrier frequency are again within the operable range of the detection system.

The output of the light source unit 10 is coupled to the interferometer 16 by way of a third coupler 52. Specifically, the light source unit 10 is coupled to an input port 52B of the coupler 52 which has a first output port 52C coupled to the input of interferometer 16 and a second output port 52D coupled to a photodetector 54, which measures the power $P_{IN}$ input to interferometer 16, and is connected to the A/D converter 42 by way of amplifier 56.

A second input port 18B of coupler 18 of the interferometer 16 is connected to a photodetector 58 whose output is coupled to the controller 44 by way of an amplifier 60 and the A/D converter 42. The photodetector 58 provides a signal representing the power $P_B$ of the light backscattered from the DUT 26. This signal may be used to measure return loss.

At the output of the interferometer 16, a second output port 24D of second coupler 24 is coupled to a photodetector 62 whose output, representing the total power P, i.e., detected with no SOP-selective property, at the output of the interferometer 16 is coupled to the controller 44 by way of amplifier 64 and A/D converter 42.

The controller 44 receives the corresponding digital signals from the A/D converter 42 and processes them to compute the Jones matrix elements, as will be described in detail later.

The tunable laser 12 can be tuned so as to vary the optical frequency of the emitted light continuously over a predetermined range of optical frequencies. The "sweep" of optical frequencies is performed at a predetermined scan speed and the sampling rate of the A/D converter 42 chosen so as to be safely higher than the overall bandwidth of the system prior thereto, i.e., the photodetector and amplifier. The output of the tunable laser 12 is directed through a depolarizer 14 which scrambles polarization state at a rate that is high relative to bandwidth of the detection system. It should be noted that the rate of change must be sufficient for fast variations due to scrambling to be filtered out, thus leaving only the mean-value, but the rate of change need not be larger than the data sampling rate. As a result, the light leaving the depolarizer 14 can be considered to be depolarized since, over the time interval (i.e., reciprocal of the detection system bandwidth) concerned, the time-averaged SOP of the light is zero, as will be described in more detail later.

The light supplied to the interferometer 16 is split into two equal portions by coupler 18. The first portion is passed through DUT 26 while the second portion traverses the reference path 20. The two portions are recombined at the coupler 24 to form a signal comprising a DC component representing the sum of the powers from the two arms, and a superimposed AC component representing the interference (product of the electric fields of the lightwaves from the two arms). The 3-way SOP splitter unit 28 splits this combined light beam into three light beams each of which impinges upon its own analyzer (i.e., SOP selector) within the 3-way SOP splitter unit 28 itself. After passing through its respective analyzer, each of the three beams is sent to a respective one of the photodetectors 30, 32 and 34, which measure the powers P1, P2 and P3, respectively.

Using the Stokes vector representation of the analyzer axes or SOPs, the three distinct Stokes vectors must not all be in the same plane, i.e., none of the three Stokes vectors can lie in the plane defined by the other two. In short, they must be linearly independent. In one practical, simple and easily realized embodiment, the Stokes vectors form a substantially right-angled trihedron, though that is not essential. Preferably, however, four linearly-independent analyzer axes are selected and form a tetrahedron with 109.5° between the Stokes vectors. This last configuration results in the minimal sensitivity of the measured parameters to noise.

The photodetectors 30, 32 and 34 detect these light beams and provide corresponding electrical signals proportional to the powers P1, P2 and P3 for each of the three SOPS. Following amplification of the three signals by the amplifiers 36, 38 and 40 and conversion to digital signals by the A/D converter 42, the controller 44 normalizes the powers P1, P2 and P3 of the three signals and the total output power P by dividing them by total input power $P_{IN}$, applies correction factors obtained from a previously-determined calibration factor, and then processes them to derive the Jones matrix elements. Once the Jones matrix elements, which are four complex numbers constituting the linear response of the DUT 26, have been computed, they can be used to compute any of the linear parameters of the DUT 26.

Before use on an actual DUT 26, a reference scan will be taken to obtain correction factors to compensate for variables, other than PDL, in the various optical and electronic components of the apparatus. These variables may include PMD, gain, variations in splitting ratios of the couplers with wavelength and time, residual chromatic dispersion and PMD in the fibers of the reference arm, and so on.

The controller 44 computes four complex numbers $t_n(\upsilon)$ (i.e., complex numbers containing amplitude and phase information as $t=\exp(\alpha+i\phi)$) as a function of optical frequency, $\upsilon$, from the digitally converted signals. These complex numbers $t_n(\upsilon)$ are related to the Jones matrix, $J(\upsilon)$, and to the unit Jones vectors, $\hat{e}_n$, by the expression $t_n(\upsilon)=\hat{e}_n^* \cdot J(\upsilon)\hat{e}_n$, where $\hat{e}_n$ ($1\leq n\leq 4$) are the unit Jones vectors that represent the four analyzer axes. Each of the numbers $t_n(\upsilon)$ corresponds to one given element of the Jones matrix, but each being expressed in its own reference frame. They must be combined in order to express the Jones matrix in a more convenient, usual form, i.e. in a single reference frame. Accordingly, a linear transformation is applied to the four complex numbers $t_n(\upsilon)$ in order to derive the elements, $J_{xx}$, $J_{xy}$, $J_{yx}$, $J_{yy}$, of the Jones matrix, i.e., each element of the Jones matrix is a linear combination of the numbers $t_n(\upsilon)$. This linear transformation is determined from the known analyzer axes of the instrument, e.g. the axes of the 3-way SOP splitter unit 28, which are known before any measurements are made on a DUT. The term "analyzer axes" refers to the axes of an optical device that selects a given SOP, i.e., only the projection of the input light onto this given SOP axis is transmitted at the output. The term "projection" means that the power $P_{OUT}$ at the output of an analyzer is given by:

$$P_{OUT}=P_{IN}|\hat{e}_a^* \cdot \hat{e}|^2 \quad (2)$$

where $P_{IN}$ is the power at the input of the analyzer, e represents the unit Jones vectors that represent the SOP of the light at the input of the analyzer, and $e_a$ is the unit Stokes vector that represents the analyzer axis.

In the reference frame $\{\hat{e}_x, \hat{e}_y\}$, the Jones matrix is explicitly written as $$J = \begin{pmatrix} J_{xx} & J_{xy} \\ J_{yx} & J_{yy} \end{pmatrix} \quad (3)$$

On the other hand, the complex numbers $t_n(\upsilon)$ can be written as the four components of a vector $$|t\rangle=(t_1 t_2 t_3 t_4)^T \quad (4)$$

and likewise the elements of the Jones matrix can also be written as the four components of a vector $$|J\rangle=(J_{xx},J_{xy},J_{yx},J_{yy})^T \quad (5)$$

Writing the unit Jones vector that represents one given analyzer axis n, ($1\leq n\leq 4$) as, $$\hat{e}_n=x_n\hat{e}_x+y_n\hat{e}_y \quad (6)$$

then it can be shown that $$|J\rangle=M^{-1}|t\rangle \quad (7)$$

where the transformation matrix M can be expressed as a function of the known $(x_n, y_n)$ as $$M = \begin{bmatrix} |x_1|^2 & x_1^* y_1 & x_1 y_1^* & |y_1|^2 \\ |x_2|^2 & x_2^* y_2 & x_2 y_2^* & |y_2|^2 \\ |x_3|^2 & x_3^* y_3 & x_3 y_3^* & |y_3|^2 \\ |x_4|^2 & x_4^* y_4 & x_4 y_4^* & |y_4|^2 \end{bmatrix} \quad (8)$$

The transformation matrix M is created from the known analyzer axes of the instrument according to the above equation and the inverse matrix $M^{-1}$ is computed once. Therefore, when a measurement is made, the processor computes the vector that contains the four elements of the Jones matrix (equation 5) from the measured $t_n(\upsilon)$ according to equation 7, and finally forms the 2×2 matrix according to equation 3. It should be noted that, if the SOPs form a regular tetrahedron, as mentioned above, the so-called "condition number" of the matrix M, and hence "noise", will be less than when the "trihedron and total power" approach is used.

A skilled person would know how to calculate the various parameters from this Jones matrix.

An advantage of the above-described interferometric optical analyzer apparatus is that it can measure substantially all of the linear parameters of the DUT 26 with a single scan of the operating range of the tunable laser 12. Consequently, stability problems are substantially avoided. Where stability is not particularly problematical, a sequential approach could be used instead. Thus, as illustrated in broken lines in FIG. 1, the 3-way SOP splitter unit 28 could be replaced by a SOP selector 66 (for example a rotatable λ/3 waveplate and fixed polarizer, or a λ/4 waveplate and polarizer, both rotatable), whose output is detected by a single photodetector 68 coupled to the A/D converter 42 by an associated amplifier 70. The SOP selector 66 would output the three SOPs individually and in succession, the tunable laser 12 being swept over the desired range for each SOP. The powers P1, P2 and P3 then would be obtained, in sequence, from the three successive powers measured by the photodetector 68. The output power P would be obtained in the same way as before.

It will be appreciated that a scanned coherent light source may be replaced by a broadband light source and a swept interferometer, as will now be described with reference to FIG. 2, in which components that are identical to those in FIG. 1 have the same reference numbers and components that correspond, but differ, have the same reference number with a prime.

Figure 2:
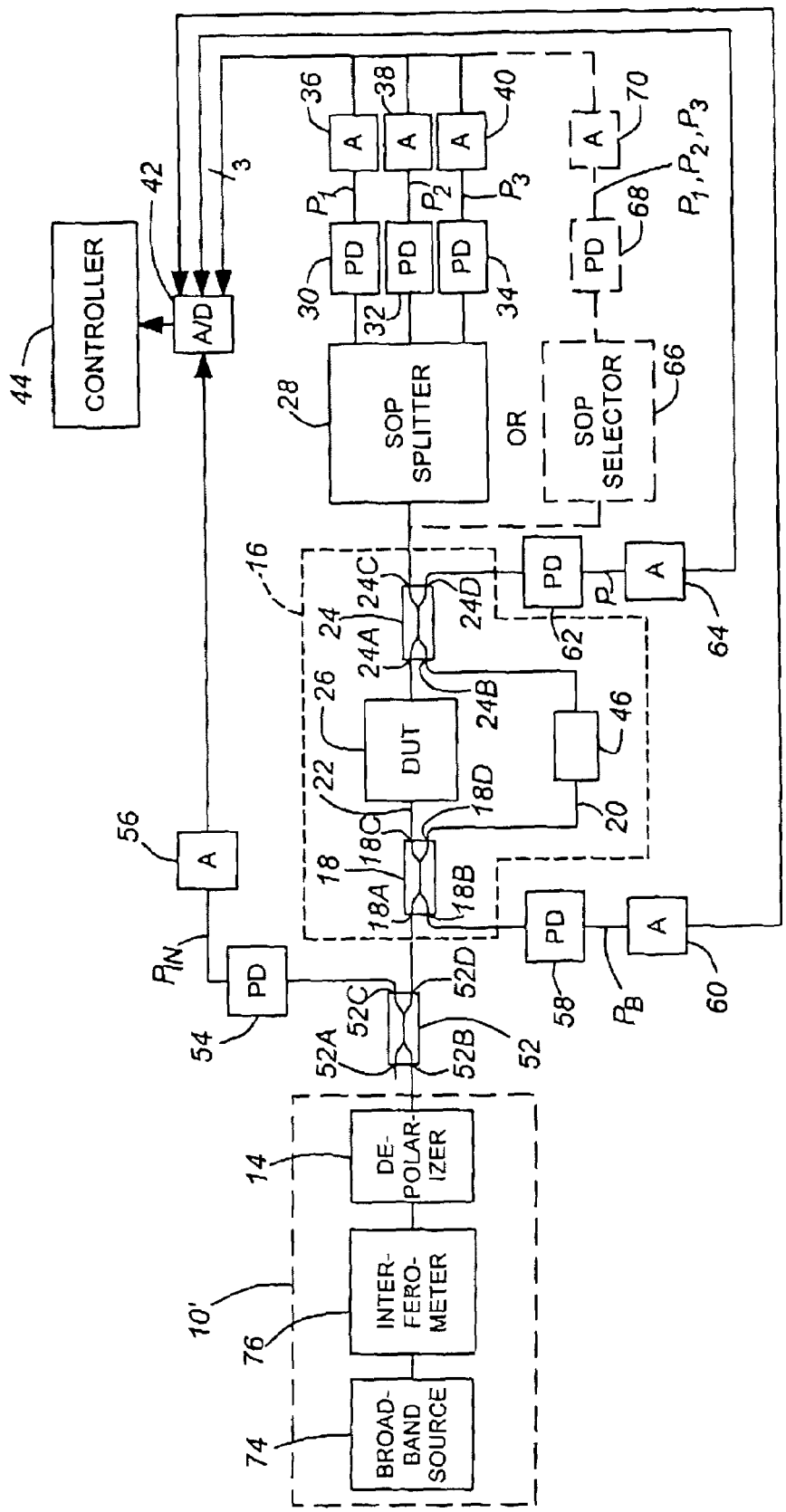
FIG. 2 is a block schematic diagram of an interferometric optical analyzer that is a second embodiment of the invention.

FIG. 2 shows an incoherent light source 10' comprising a broadband source 74, such as an amplified spontaneous emission (ASE) source or LED(s), and a swept-Michelson interferometer 76. If the incoherent light source 10' is a LED which emits substantially polarized light, a depolarizer 14 must be coupled to the output of the source LED 10' or to the output of the swept-Michelson interferometer 76.

If the incoherent light source 10' is an ASE source which emits substantially unpolarized light, the depolarizer 78 may not be needed. However, it may be included to compensate for any polarization dependency of the LED and/or swept-Michelson interferometer 76. The output of the incoherent light source 10' is coupled to an input port 52B of the coupler 52, as in the first embodiment. Other components of the embodiment shown in FIG. 2 are similar to those shown in FIG. 1 and so will not be described again.

It should be appreciated that, in either embodiment, the depolarizer 14 may take any suitable form, providing it scrambles state of polarization rapidly enough.

The term "depolarized" or "unpolarized", as used to describe the light leaving the depolarizer 14, is intended to mean that the state-of-polarization (SOP), averaged over a period of time that is sufficiently long, is substantially zero. Hence, while the laser's wavelength is swept and a signal is being detected and sampled, the instantaneous SOP at the output of the depolarizer must describe, as a function of time, either of a random or a substantially periodic trajectory on the Poincaré sphere Moreover, the average of the Stokes vector must be substantially zero, and the different harmonic frequencies of the substantially periodic trajectory must fall out of the passband of the detection system. The passband of the detection system is the combined, overall passband of the photodetectors followed by amplifiers, analog or digital filters, lowpass or bandpass filtering, or any other means of filtering the signal before sampling. This condition must be met for all photodetectors and their subsequent analog or digital processing, In the case where the trajectory on the Poincaré sphere is random instead of periodic, the bandwidth of each of the three, randomly varying components of the Stokes vector (output SOP of depolarizer 14), must be vastly larger than the detection system bandwidth, i.e., not only somewhat larger. This is because, in contrast to a periodical trajectory, a random trajectory gives an undesirable noise floor within the measurement bandwidth. However, this undesirable noise floor is inversely proportional to the bandwidth of the randomly varying Stokes parameters. Thus, the noise floor can indeed be made negligible in the condition stated above, i.e., provided that the bandwidth of the Stokes parameters variations is vastly larger than the effective detection system bandwidth.

It should also be noted that the 3-way SOP splitter unit 28 is not a stand-alone polarimeter. The splitting ratios, as well as the gains of the detector unit channels, i.e., photodetectors, amplifiers, do not need to be calibrated with the measurement method according to this invention.

The photodetectors 30, 32 and 34 do not need to lie near the 3-way SOP splitter unit 28. The output beams of the 3-way SOP splitter unit 28 may be sent to the photodetectors through optical fibers, for example, or by any other suitable means. Alternatively, the photodetectors may be integrated into the 3-way SOP splitter unit 28.

It should be appreciated that, although the second embodiment has the swept-Michelson interferometer before the first interferometer 16, it could be placed after the interferometer 16 without loss of functionality, It is common knowledge among those skilled in this art that the Michelson interferometer used for Fourier transform spectroscopy can be put indifferently at input or output.

It should be noted that the above-described embodiments measure only three substantially linearly independent SOP, and compute the fourth SOP power P4 required to compute the Jones matrix from the three powers P1, P2, P3 and the total power P, this being allowed by the fact that the observed total power $P(\upsilon)$ is equal to the sum of powers observed along any two orthogonal SOPS. Alternatively, however, a fourth analyzer could be provided with its axis oriented so that the corresponding Stokes vector is opposed to that of one of the other analyzers, i.e., the resulting SOP points are antipodal on the Poincaré sphere, and the power P4 along its axis measured directly.

The first three unit Stokes vectors form a trihedron. Subtracting a given power Pn from total power P, i.e. more rigorously, subtracting the corresponding complex numbers according to the expression $t_4 = t\exp(i\pi) - t_n$ provides the value of $t_4$ that would be measured along the fourth axis represented by the Stokes vector $s_4 = -s_n$. The minus sign signifies "opposed on the Poincaré sphere".

It should be noted that the optical element or DUT 26 could comprise several components and the "overall" Jones matrix be computed for them. Alternatively, the Jones matrix for each of them could be determined individually by performing measurements with different delays. This would, of course, require more bandwidth.

It should be appreciated that, although a substantially linear sweep (constant scan speed) of the optical frequency is preferred, it is not essential. The same applies to the scanning of the delay in the embodiments which employ a broadband source and a Michelson interferometer. Providing it remains small and slow, non-linearity of the scan will not impair the performance. For example, if it is wavelength that is linearly scanned instead of the optical frequency, the small resulting non-linearity of the scan will have no detrimental effect.

INDUSTRIAL APPLICABILITY

The method and apparatus are such that the required bandwidth of the detection system (or, equivalently, the required delay range of the measurement) is reduced when compared to prior art swept-wavelength interferometric measurements, while maintaining the ability to carry out a fast, single-scan measurement. This is important because the spectral density of the noise in the detected signal increases with the detection bandwidth. Prior art apparatus must be able to detect signals modulating carriers at two distinct frequencies, whereas in embodiments of the present invention, the detection bandwidth need only cover one carrier frequency.

Advantageously, in embodiments of the invention, the variable delay in the reference arm of the interferometer allows for adjustment of the reference path length relative to the path length of the DUT so that the resulting carrier frequency is substantially centered in the bandwidth of the detection system. The required bandwidth is determined by the maximum length of the DUT and the scanning speed, which ideally should be as fast as possible, and the variable delay allows further reduction of the bandwidth by even a much larger factor as compared with currently available OVAs.

Although embodiments of the invention have been described and illustrated in detail, it is to be clearly understood that the same is by way of illustration and example only and not to be taken byway of the limitation, the spirit and scope of the present invention being limited only by the appended claims.

The invention claimed is:

1. An interferometric optical analyzer apparatus for determining the linear response of an optical element (DUT) (26), comprising:

light source means (10) for supplying substantially unpolarized coherent light whose optical frequency is swept continuously and monotonically as a function of time over a predetermined range;

interferometer means (16) having input means (18) coupled to an output of the light source means (10), first and second arms (20,22,26;46), the first arm (22) for receiving said optical element (26) in series therein and the second arm (20) being a reference path, and output means (24); and detection means for determining polarization-dependent power (P1,P2,P3) of light at the interferometer output for each of three linearly-independent states of polarization and a fourth power comprising either one of a power (P4) corresponding to a fourth linearly independent state of polarization and a total polarization-independent power (P) of said light at the interferometer output, the optical analyzer apparatus further comprising controller means (44) for controlling the sweep of the light source means and computing Jones matrix elements ($J_{xx}$, $J_{xy}$, $J_{yx}$, $J_{yy}$) from the at least four power measurements (P1,P2,P3,P/P4).

2. Apparatus according to claim 1, wherein the three unit Stokes vectors representing said at least three different states of polarization form a substantially right-angled trihedron.

3. Apparatus according to claim 1, further comprising delay means (46) in either or both arms of the interferometer.

4. Apparatus according to claim 3, wherein the delay means (46) is adjustable.

5. Apparatus according to claim 1, wherein the controller causes the optical frequency of the light source to vary substantially linearly.

6. Apparatus according to claim 1, wherein the light source means (10) comprises a tunable laser (12) and a depolarizer (14).

7. Interferometric optical analyzer apparatus for determining the linear response of an optical element (DUT) (26), comprising:

light source means (10') for supplying unpolarized incoherent light;

interferometer means (16) having input means (18) coupled to an output of the light source means (10), first and second arms (20,22,26;46), the first arm (22) for receiving said optical element (26) in series therein and the second arm (20) being a reference path, and output means (24);

optical delay scanning means (76) for analyzing the broadband light according to wavelength;

detection means for determining polarization-dependent power (P1,P2,P3), for each of three linearly-independent states of polarization, of light that has passed through the interferometer (16) and been analyzed by the optical delay scanning means (76) and determining a fourth power comprising either one of a power (P4) corresponding to a fourth linearly independent state of polarization and a total polarization-independent power (P) of said light at the interferometer output; and controller means (44) for controlling the scanning of the optical delay scanning means (76) and computing Jones matrix elements ($J_{xx}$, $J_{xy}$, $J_{yx}$, $J_{yy}$) from the at least four power measurements (P1,P2,P3,P/P4).

8. Apparatus according to claim 7, wherein, in use, the broadband light source means (74) emits substantially unpolarized light.

9. Apparatus according to claim 8, wherein the broadband light source means (74) comprises an amplified spontaneous emission (ASE) source.

10. Apparatus according to claim 7, wherein the broadband source means (74) emits substantially polarized light and the apparatus further comprises a depolarizer (14).

11. Apparatus according to claim 10, wherein the broadband light source means (74) comprises one or more LEDs.

12. Apparatus according to claim 7, wherein at least one of the broadband light source means (74) and the optical delay scanning means (76) exhibits polarization dependency and the light source unit (10') further comprises a depolarizer (14).

13. Apparatus according to claim 7, wherein the optical delay scanning means (76) is disposed before the interferometer (16).

14. Apparatus according to claim 7, wherein the optical delay scanning means (76) is disposed after the interferometer (76).

15. Apparatus according to claim 13, wherein the optical delay scanning means (76) comprises a Michelson interferometer.

16. Apparatus according to claim 1, wherein the detection means comprises polarization splitting means (28) for splitting the output signal of the interferometer (16) into three signals corresponding to said three linearly-independent states of polarization, each of the three signals representing the projection of the input light onto the corresponding analyzer axis, and three photodetectors (30,32,34) for detecting the three signals, respectively.

17. Apparatus according to claim 1, wherein the detection means comprises polarization selection means (66) for selecting and outputting, in succession, signals corresponding to said three linearly-independent states of polarization states-of-polarization each of these signals representing the projection of the input light onto the corresponding analyzer axis, and photodetector means (70) for detecting the outputted signals.

18. Apparatus according to claim 1, further comprising means (52C,54) for measuring the input power ($P_{IN}$) of the light entering the interferometer.

19. Apparatus according to, claim 1, wherein said detection means measures said total polarization-independent power (P) of the light leaving the interferometer, and comprises means (24D,54) for measuring said total polarization-independent power (P).

20. Apparatus according to claim 1, further comprising means (18B, 58) coupled to the input of the interferometer (16) for detecting the power ($P_B$) of backscatter.

21. Apparatus according to claim 1, wherein the controller means (44):

receives the at least four power measurements (P1,P2,P3, P/P4) and associates each of them with the corresponding one of the four distinct analyzer axes or three distinct analyzer axes and total power, as appropriate;

extracts phase and amplitude information from the measurements; and applies a predetermined linear transformation to the phase and amplitude information to obtain Jones matrix elements ($J_{xx}$, $J_{xy}$, $J_{yx}$, $J_{yy}$) for the optical element (26).

22. Apparatus according to claim 21, wherein said controller means (44) determines said transformation matrix from the set of analyzer axes before any measurements are made on said optical element.

23. Apparatus according to claim 7, wherein the three unit Stokes vectors representing said at least three different states of polarization form a substantially right-angled trihedron.

24. Apparatus according to claim 7, further comprising delay means (46) in either or both arms of the interferometer.

25. Apparatus according to claim 24, wherein the delay means (46) is adjustable.

26. A method for determining the linear response of an optical element (DUT) (26), comprising the steps of:

connecting the DUT into a first arm of an interferometer means (16), a second arm of the interferometer means being a reference path, the first and second arms being connected between input means (18) and output means (24) of the interferometer means, an optical length difference between the said first and second arms defining a relative delay between light propagating along the two paths so as to produce interference at the output means;

supplying substantially unpolarized coherent light whose optical frequency ($\upsilon$) is swept continuously and monotonically as a function of time over a predetermined range into the input means of the interferometer means (16), using detection means comprising analyzing polarizers, detecting three polarization-dependent power values (P1,P2,P3) of three linearly-independent states of polarization, respectively, of light at said output means as a function of optical frequency ($\upsilon$) and a fourth power value (P/P4) comprising either one of a power value corresponding to a total polarization-independent power value (P) and a fourth linearly-independent state of polarization (P4) of said light at the interferometer output, and computing the Jones matrix elements ($J_{xx}, J_{xy}, J_{yx}, J_{yy}$) from the four measured power values.

27. A method according to claim 26, wherein said four measured signals corresponding to the optical power values (P1,P2,P3,P/P4) provide amplitude and phase information that is minimally sufficient to compute the Jones matrix elements ($J_{xx}, J_{xy}, J_{yx}, J_{yy}$) of the said optical element.

28. A method according to claim 26, wherein each of said four measured signals has an electrical bandwidth approximately equal to the product of the laser optical-frequency scan speed and the maximal said relative delay.

29. A method according to claim 26, wherein the four-element vector $|J\rangle$ representing the elements of the Jones matrix, is determined according to the expression $$|J\rangle = M^{-1}|t\rangle$$

where $M^{-1}$ is the inverse of the transformation matrix M representing the known transfer function of the combined interferometer means and detector means, and $|t\rangle$ is another four-element vector whose elements comprise the measured powers $P_n(\upsilon)$ expressed in phasor notation.

30. Apparatus according to claim 1, wherein the said four measured power values provide amplitude and phase information that is minimally sufficient to compute the Jones matrix elements ($J_{xx}, J_{xy}, J_{yx}, J_{yy}$) of the said optical element from the four power measurements (P1,P2,P3,P/P4).

31. Apparatus according to claim 1, wherein said detection means has an electronic bandwidth approximately equal to the product of the laser optical-frequency scan speed and the maximal said relative delay.

32. Apparatus according to claim 1, wherein said controller means computes the four-element vector $|J\rangle$ representing the elements of the Jones matrix, according to the expression $$|J\rangle = M^{-1}|t\rangle$$

where $M^{-1}$ is the inverse of the transformation matrix M representing the known transfer function of the combined interferometer means and detector means, and $|t\rangle$ is another four-element vector whose elements comprise the measured powers $P_n(\upsilon)$ expressed in phasor notation.

33. A method for determining the linear response of an optical element (DUT) (26), comprising the steps of:

connecting the DUT into a first arm of an interferometer means (16), a second arm of the interferometer means being a reference path, the first and second arms being connected between input means (18) and output means (24) of the interferometer means, an optical length difference between the said first and second arms defining a relative delay between light propagating along the two paths so as to produce interference at the output means;

supplying substantially unpolarized incoherent light into the input means of the interferometer means (16) by way of optical delay scanning means (76) for analyzing said substantially unpolarized incoherent light according to wavelength, using detection means comprising analyzing polarizers, detecting three polarization-dependent power values (P1,P2,P3) of three linearly-independent states of polarization, respectively, of light at said output means as a function of optical frequency ($\upsilon$) and a fourth power value (P/P4) comprising either one of a power value corresponding to a total polarization-independent power (P) or a fourth linearly-independent state of polarization (P4) of said light at the interferometer output, and computing the Jones matrix elements ($J_{xx}, J_{xy}, J_{yx}, J_{yy}$) from the four measured power values (P1,P2,P3,P/P4).

* * * * *

UNITED STATES PATENT AND TRADEMARK OFFICE
CERTIFICATE OF CORRECTION

| | | |
|---|---|---|
| PATENT NO. | : 7,426,021 B2 | Page 1 of 1 |
| APPLICATION NO. | : 11/287972 | |
| DATED | : September 16, 2008 | |
| INVENTOR(S) | : Norman Cyr | |

It is certified that error appears in the above-identified patent and that said Letters Patent is hereby corrected as shown below:

Title Page item 73 should read - EXFO Electro-Optical Engineering Inc.

Signed and Sealed this

Fourteenth Day of April, 2009

JOHN DOLL
*Acting Director of the United States Patent and Trademark Office*